US011333528B1

United States Patent
Schroers et al.

(10) Patent No.: US 11,333,528 B1
(45) Date of Patent: May 17, 2022

(54) METHOD FOR ON-CHIP WHEEL PITCH RECOGNITION FOR MAGNETORESISTIVE SENSORS

(71) Applicant: Infineon Technologies AG, Neubiberg (DE)

(72) Inventors: Christoph Schroers, Villach (AT); Alessandro Petri, Villach (AT); Massimiliano Zilli, Villach (AT)

(73) Assignee: Infineon Technologies AG

( * ) Notice: Subject to any disclaimer, the term of this patent is extended or adjusted under 35 U.S.C. 154(b) by 23 days.

(21) Appl. No.: 17/087,942

(22) Filed: Nov. 3, 2020

(51) Int. Cl.
*G01D 5/16* (2006.01)
*G01D 5/244* (2006.01)

(52) U.S. Cl.
CPC ............... *G01D 5/16* (2013.01); *G01D 5/244* (2013.01)

(58) Field of Classification Search
CPC ............ G01D 5/12–2525; G01R 33/02; G01R 33/06–098
See application file for complete search history.

(56) References Cited

U.S. PATENT DOCUMENTS

| 10,969,251 | B2 * | 4/2021 | Mottram | G01D 5/2053 |
| 2008/0116886 | A1 * | 5/2008 | Yamada | G01D 5/145 |
| | | | | 324/207.21 |
| 2010/0253258 | A1 * | 10/2010 | Fabis | H02P 21/0025 |
| | | | | 318/400.13 |
| 2013/0293223 | A1 * | 11/2013 | Youngner | G01D 18/00 |
| | | | | 324/207.12 |

* cited by examiner

*Primary Examiner* — Huy Q Phan
*Assistant Examiner* — David B Frederiksen
(74) *Attorney, Agent, or Firm* — Design IP

(57) ABSTRACT

A sensor device includes a first sensor arrangement configured to generate first sensor signals based on sensing a varying magnetic field generated by a pole wheel having a pole wheel pitch, wherein the first sensor signals represent a first differential signal that defines a first measurement value; a second sensor arrangement configured to generate at least one second sensor signal based on sensing the varying magnetic field, wherein the at least one second sensor signal defines a second measurement value that is phase shifted from the first measurement value; and a signal processor configured to detect the pole wheel pitch based on the first measurement value and the second measurement value, and adjust a gain setting of an amplifier circuit based on the detected pole wheel pitch, where the amplifier circuit is configured to amplify the at least one second sensor signal.

26 Claims, 4 Drawing Sheets

METHOD FOR ON-CHIP WHEEL PITCH RECOGNITION FOR MAGNETORESISTIVE SENSORS

BACKGROUND

Magnetic speed sensors are used in speed sensing for many applications in many industries including in the automotive industry for wheel speed, engine speed, and transmission speed, and the like. In the field of speed sensing, a sinusoidal signal may be generated by a magnetic sensor in response to a rotation of a target object, such as a wheel, camshaft, crankshaft, or the like. The sinusoidal signal may be translated into pulses, which is further translated into a movement detection or a speed output.

Information from a speed sensor may generate a speed signal from which the speed of the target object can be extracted as well as a direction signal that in combination with the speed signal gives the rotational direction of the movement of the target object. Thus, a speed sensor may generate a speed signal and a direction signal. Based on one or both of these signals additional output signals (e.g., pulsed output signals) are generated that provide sensor information to a microcontroller that uses the pulsed output signal.

A sensor element pitch is the lateral, center-to-center, distance between two magnetic field sensor elements that are arranged along a rotation direction of the target object.

A pitch of a pole wheel is the center-to-center distance along a pitch circle between two neighboring poles of the same polarity (i.e., between two neighboring positive poles or two neighboring negative poles). Two neighboring poles of the same polarity have one pole of opposite polarity interposed therebetween. Thus, a half-pitch of a pole wheel is the center-to-center distance along a pitch circle between two adjacent poles of different (i.e., opposite) polarity. In other words, the half-pitch is the distance along a pitch circle between a center of positive pole and a center of a negative pole that is adjacent to the positive pole.

For a good system performance, the sensor element pitch of a sensor integrated circuit (IC) and the wheel half-pitch should match each other (1:1). In other words, the sensor element pitch should be half of the wheel pitch (1:2). This ratio provides improved signal-to-noise ratio. Unfortunately, this is not always possible because one sensor IC can be designed for different platforms that use different wheels with different wheel pitches. If the sensor element pitch and the wheel half-pitch are not matched, performance can be lost.

Therefore, an improved magnetic field sensor capable of determining the wheel pitch and performing compensation based thereon may be desirable.

SUMMARY

Embodiments provide a sensor device that includes: a first sensor arrangement including a plurality of first sensor elements configured to generate first sensor signals based on sensing a varying magnetic field generated by a pole wheel having a pole wheel pitch, wherein the first sensor signals represent a first differential signal that defines a first measurement value; a second sensor arrangement including at least one second sensor element configured to generate at least one second sensor signal based on sensing the varying magnetic field generated by the pole wheel, wherein the at least one second sensor signal defines a second measurement value that is phase shifted from the first measurement value; a first amplifier circuit configured to receive and amplify the first sensor signals to generate amplified first sensor signals; a second amplifier circuit configured to receive and amplify the at least one second sensor signal to generate at least one amplified second sensor signal; and a sensor circuit configured to convert the amplified first sensor signals into the first differential signal having the first measurement value and convert the at least one amplified second sensor signal into a measurement signal having the second measurement value. The sensor circuit includes a signal processor configured to detect the pole wheel pitch based on the first measurement value and the second measurement value, and adjust a gain setting of the second amplifier circuit based on the detected pole wheel pitch.

Embodiments further provide a sensor device that includes: a first sensor arrangement including a plurality of first sensor elements configured to generate first sensor signals based on sensing a varying magnetic field generated by a pole wheel having a pole wheel pitch, wherein the first sensor signals represent a first differential signal that defines a first measurement value; a second sensor arrangement including at least one second sensor element configured to generate at least one second sensor signal based on sensing the varying magnetic field generated by the pole wheel, wherein the at least one second sensor signal defines a second measurement value that is phase shifted from the first measurement value; a first amplifier circuit configured to receive and amplify the first sensor signals to generate amplified first sensor signals; a second amplifier circuit configured to receive and amplify the at least one second sensor signal to generate at least one amplified second sensor signal; and a sensor circuit configured to convert the amplified first sensor signals into the first differential signal having the first measurement value and convert the at least one amplified second sensor signal into a measurement signal having the second measurement value. The sensor circuit includes a signal processor configured to correlate a combination of the first measurement value and the second measurement value to a corresponding gain setting of a plurality of gain settings, select the corresponding gain setting from among the plurality of gain settings based on the combination of the first measurement value and the second measurement value, and set the selected corresponding gain setting as the gain setting of the second amplifier circuit.

Embodiments further provide a method for calibrating a magnetic field sensor circuit based on a pole wheel pitch of a pole wheel. The method includes: generating first sensor signals, by a first sensor arrangement, based on sensing a varying magnetic field generated by the pole wheel, wherein the first sensor signals represent a first differential signal that defines a first measurement value; generating at least one second sensor signal, by a second sensor arrangement, based on sensing the varying magnetic field generated by the pole wheel, wherein the at least one second sensor signal defines a second measurement value that is phase shifted from the first measurement value; amplifying the first sensor signals, by a first amplifier circuit, to generate amplified first sensor signals; amplifying the at least one second sensor signal, by a second amplifier circuit, to generate at least one amplified second sensor signal; converting the amplified first sensor signals, by a sensor circuit, into the first differential signal having the first measurement value; converting the at least one amplified second sensor signal, by the sensor circuit, into a measurement signal having the second measurement value; correlating, by the sensor circuit, a combination of the first measurement value and the second measurement value to a corresponding gain setting of a plurality of gain settings; selecting, by the sensor circuit, the corresponding gain setting from among the plurality of gain settings based on the combination of the first measurement value and the second measurement value; and setting, by the sensor circuit, the selected corresponding gain setting as the gain setting of the second amplifier.

BRIEF DESCRIPTION OF THE DRAWINGS

Embodiments are described herein making reference to the appended drawings.

DETAILED DESCRIPTION

Figure 1A:
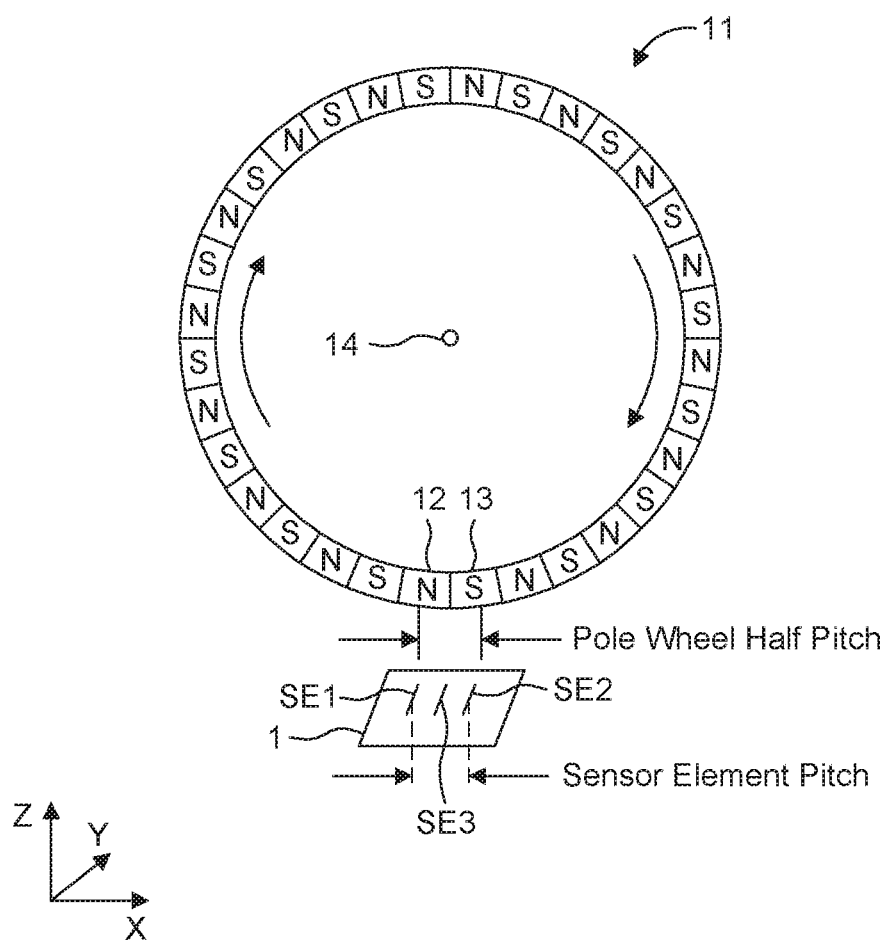
FIG. 1A illustrates a magnetic field sensing principle using a pole wheel according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. It is also to be understood that other embodiments may be utilized and structural or logical changes may be made without departing from the scope defined by the claims. The following detailed description, therefore, is not to be taken in a limiting sense.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Directional terminology, such as "top", "bottom", "above", "below", "front", "back", "behind", "leading", "trailing", "over", "under", etc., may be used with reference to the orientation of the figures and/or elements being described. Because the embodiments can be positioned in a number of different orientations, the directional terminology is used for purposes of illustration and is in no way limiting. In some instances, directional terminology may be exchanged with equivalent directional terminology based on the orientation of an embodiment so long as the general directional relationships between elements, and the general purpose thereof, is maintained.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

Depending on certain implementation requirements, a storage medium may include a RAM, a ROM, a PROM, an EPROM, an EEPROM, a FLASH memory, or any other medium having electronically readable control signals stored thereon, which cooperate (or are capable of cooperating) with a programmable computer system such that the respective method is performed. Therefore, a storage medium may be regarded as a non-transitory storage medium that is computer readable.

Additionally, instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. A "controller," including one or more processors, may use electrical signals and digital algorithms to perform its receptive, analytic, and control functions, which may further include corrective functions.

A sensor may refer to a component which converts a physical quantity to be measured to an electric signal, for example, a current signal or a voltage signal. The physical quantity may for example comprise a magnetic field, an electric field, a pressure, a force, a temperature, a current, or a voltage, but is not limited thereto. A sensor device, as described herein, may be a voltage sensor, a current sensor, a temperature sensor, a magnetic sensor, and the like.

A magnetic field sensor, for example, includes one or more magnetic field sensor elements that measure one or more characteristics of a magnetic field (e.g., an amount of magnetic field flux density, a field strength, a field angle, a field direction, a field orientation, etc.). The magnetic field may be produced by a magnet, a current-carrying conductor (e.g., a wire), the Earth, or other magnetic field source. Each magnetic field sensor element is configured to generate a sensor signal (e.g., a voltage signal) in response to one or more magnetic fields impinging on the sensor element. Thus, a sensor signal is indicative of the magnitude and/or the orientation of the magnetic field impinging on the sensor element.

Magnetic field sensor elements include, but is not limited to, magneto-resistive sensors, often referred to as XMR sensors which is a collective term for anisotropic magneto-resistive (AMR), giant magneto-resistive (GMR), tunneling magneto-resistive (TMR), etc. The sensor circuit may be referred to as a signal processing circuit and/or a signal conditioning circuit that receives one or more signals (i.e., sensor signals) from one or more magnetic field sensor elements in the form of raw measurement data and derives, from the sensor signal, a measurement signal that represents the magnetic field.

In some cases, a measurement signal may be differential measurement signal that is derived from sensor signals generated by two sensor elements having a same sensing axis (e.g., two sensor elements sensitive to the same magnetic field component) using differential calculus. A differential measurement signal provides robustness to homogenous external stray magnetic fields.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal, to be discussed below. Therefore, a chip, which may also be referred to as an integrated circuit (IC), may include a circuit that conditions and amplifies the small signal of one or more magnetic field sensor elements via signal processing and/or conditioning.

A sensor device, as used herein, may refer to a device which includes a sensor and sensor circuit as described above. A sensor device may be integrated on a single semiconductor die (e.g., silicon die or chip). Thus, the sensor and the sensor circuit are disposed on the same semiconductor die.

Magnetic field sensors provided herein may be configured for speed measurements and rotation direction measurements of a rotating magnetic encoder, such as a wheel or camshaft, referred to as a target object or target wheel. Magnetic field sensors may also measure the magnetic phase where one magnetic period is correlated into 360 degrees.

One type of magnetic encoder is a pole wheel that consists of alternating magnets, which are magnetized in opposite directions (e.g., alternating south-pole and north-pole magnets) and arranged along a circumference of the encoder. In this case the speed sensor is placed in front or on the side of the pole wheel where the distance between the sensor module and the pole wheel is defined by an air gap. The sensor module detects if the measured magnetic field changes its polarity. In this case, the speed sensor generates an output signal that indicates that a pole passed by.

FIG. 1A illustrates a magnetic field sensing principle using a pole wheel according to one or more embodiments.

A sensor module 1 is a speed sensor that includes a first sensor element arrangement and a sensor circuit (not shown). The first sensor element arrangement is a first sensing structure that includes two differential magnetic field sensor elements, SE1 and SE2. The sensor signals of each differential sensor element SE1 and SE2 is provided to the sensor circuit that calculates a differential measurement signal using a differential calculation that may be used to cancel out homogeneous stray-fields in the sensor plane directions. A sensor element pitch is the lateral, center-to-center, distance between the two magnetic field sensor elements SE1 and SE2 that are arranged along a rotation direction of the target object (i.e., the pole wheel 11).

The sensor arrangement is configured to sense a magnetic field produced by the pole wheel 11. The sensor arrangement may generally be referred to herein as speed sensor arrangement and may further include a sensor circuit (not shown) and may be disposed in a sensor package.

The pole wheel 11 is a magnetized encoder wheel that comprises alternating north pole sections 12 and south pole sections 13. The sensor elements SE1 and SE2 are sensitive to magnetic fields influenced by the north pole sections 12 and south pole sections 13 of the pole wheel 11. A pitch of a pole wheel is the center-to-center distance along a pitch circle between two neighboring poles of the same polarity (i.e., between two neighboring positive poles or two neighboring negative poles). Two neighboring poles of the same polarity have one pole of opposite polarity interposed therebetween. Thus, a half-pitch of a pole wheel is the center-to-center distance along a pitch circle between two adjacent poles of different (i.e., opposite) polarity. In other words, the half-pitch is the distance along a pitch circle between a center of positive pole and a center of a negative pole that is adjacent to the positive pole.

For a good system performance, the sensor element pitch of a sensor integrated circuit (IC) and the wheel half-pitch should match each other (1:1). In other words, the sensor element pitch should be half of the wheel pitch (1:2). This ratio provides improved signal-to-noise ratio.

In practice, the sensor elements SE1 and SE2 may both have a sensitivity axis aligned in the x-direction such that they are sensitive to an x-component Bx of the magnetic field produced by the pole wheel. As a result of their sensitivity axis being aligned with the x-component Bx of the magnetic field, the sensor elements SE1 and SE2 generate electrical signals that are representative of or proportional to the magnitude of the x-component Bx. The sensor circuit of the sensor arrangement generates a sensor output that corresponds to the rotational speed of the magnetized encoder wheel 11 by detecting the change of the alternating magnetic field produced by alternating north and south poles passing by the sensor arrangement as the pole wheel 11 rotates about its rotation axis 14.

As the pole wheel 11 rotates, the positive poles 12 and the negative poles 13 alternate past the sensor module 1 and the sensor elements within the sensor arrangement sense a change in the x-axis or the y-axis magnetic field strength that varies as a sinusoidal waveform (i.e., as a signal modulation), the frequency of which corresponds to a speed of rotation of the wheel, and which further corresponds to a speed of rotation of a drive shaft (e.g., camshaft) that drives the rotation of the wheel.

Thus, the sensor circuit of the sensor arrangement receives signals (i.e., sensor signals) from the magnetic field sensor elements SE1 and SE2 and derives, from the sensor signals, a differential measurement signal that represents the magnetic field as a signal modulation. The differential measurement signal may then be output as an output signal to an external controller, control unit, or processor (e.g., an ECU), or used internally by the sensor circuit for further processing (e.g., to generate a pulsed output signal) before being output to the external device. For example, the external device may count the pulses of the pulsed output signal and calculate a wheel-speed therefrom. The differential measurement signal may be referred to as a speed signal from which the speed of the target object can be extracted.

In addition, the sensor module 1 may include a second sensor arrangement as a second sensing structure that is used to generate a direction signal indicative, in combination with the speed signal, of the rotational direction (e.g., clockwise or counter-clockwise) of the pole wheel 11. Here, the second sensing structure is comprised of a single, monocell sensor element SE3 (i.e., a third magnetic field sensor element) that is arranged in the middle between the two differential sensor elements SE1 and SE2 of the first sensing structure to enable the sensor to detection a rotational direction of the wheel 11. The sensor element SE3 may also have a sensitivity axis aligned in the x-direction.

In particular, the first sensor arrangement may be configured to generate a speed sensor signal and the second sensor arrangement may be configured to generate a direction sensor signal that is phase shifted 90° or substantially 90° from the speed sensor signal. The phase shift between the speed signal and direction signal can be evaluated by the sensor circuit and the rotation direction of a target object can be determined based on whether the phase shift is positive or negative. For example, the differential sensor elements SE1 and SE2 may be used to generate a sinusoidal speed signal and the third sensor element SE3 may be used to generate a sinusoidal (cosinusoidal) direction signal that is phase shifted 90° from the speed signal. By monitoring the direction of the phase shift (e.g., positive or negative), the sensor circuit can determine a rotational direction of the magnetic field and thus of the target object.

While the second sensing structure is shown as being formed by a monocell sensor element, it will be appreciated that the second sensing structure may also comprise a plurality of sensor elements that are used to generate a differential sensor signal that is phase shifted 90° or substantially 90° from the speed sensor signal, which is also a differential signal. The phase shift is caused by the geometrical placement of the sensor elements (e.g., SE1, SE2, and SE3) relative to each other.

In addition, it will be appreciated that the first sensor arrangement may be comprised of two or more sensor elements for generating the speed sensor signal, while the second sensor arrangement may be comprised of one or more sensor elements for generating the direction sensor signal. In the event that a sensor arrangement includes two or more sensing elements, the sensing elements of each respective sensor arrangement may be arranged in a differential configuration and/or a bridge configuration. For example, sensor elements used for generating a speed sensor signal may include four or more sensor elements arranged in a bridge configuration that outputs the speed sensor signal as a first differential signal. Similarly, sensor elements used for generating a direction sensor signal may include four or more sensor elements arranged in a bridge configuration that outputs the direction sensor signal as a second differential signal.

Figure 1B:
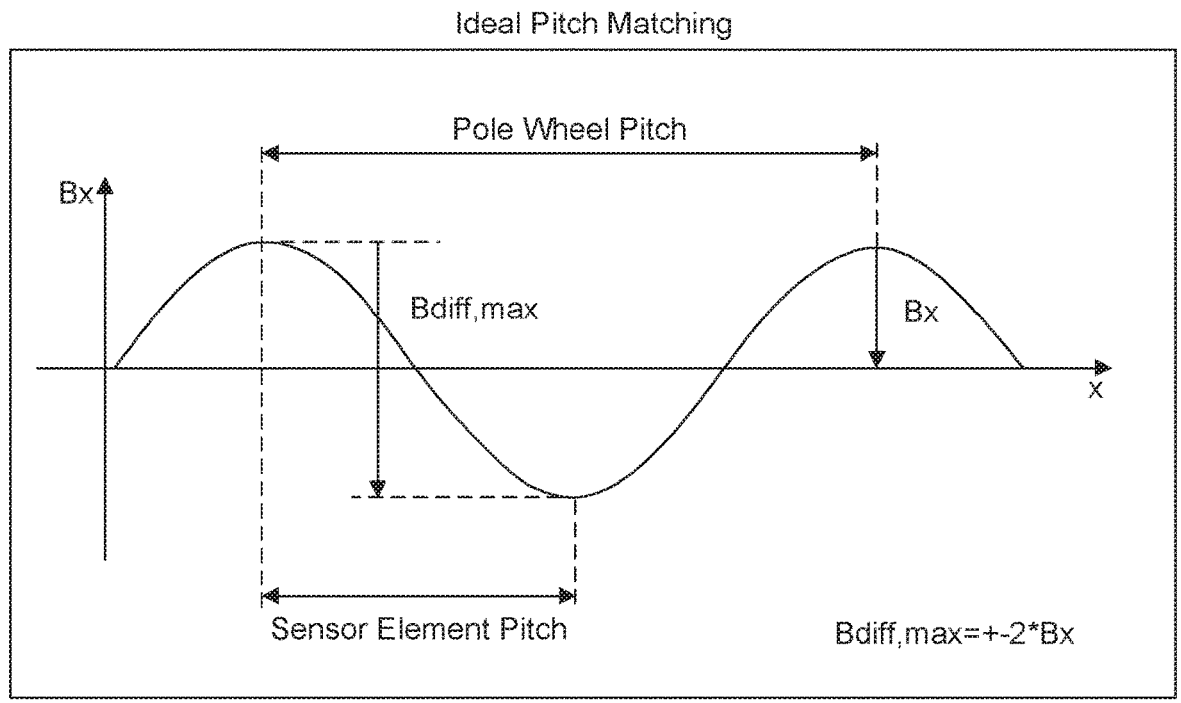
FIGS. 1B and 1C illustrate a pitch matching principle according to one or more embodiments.
Figure 1C:
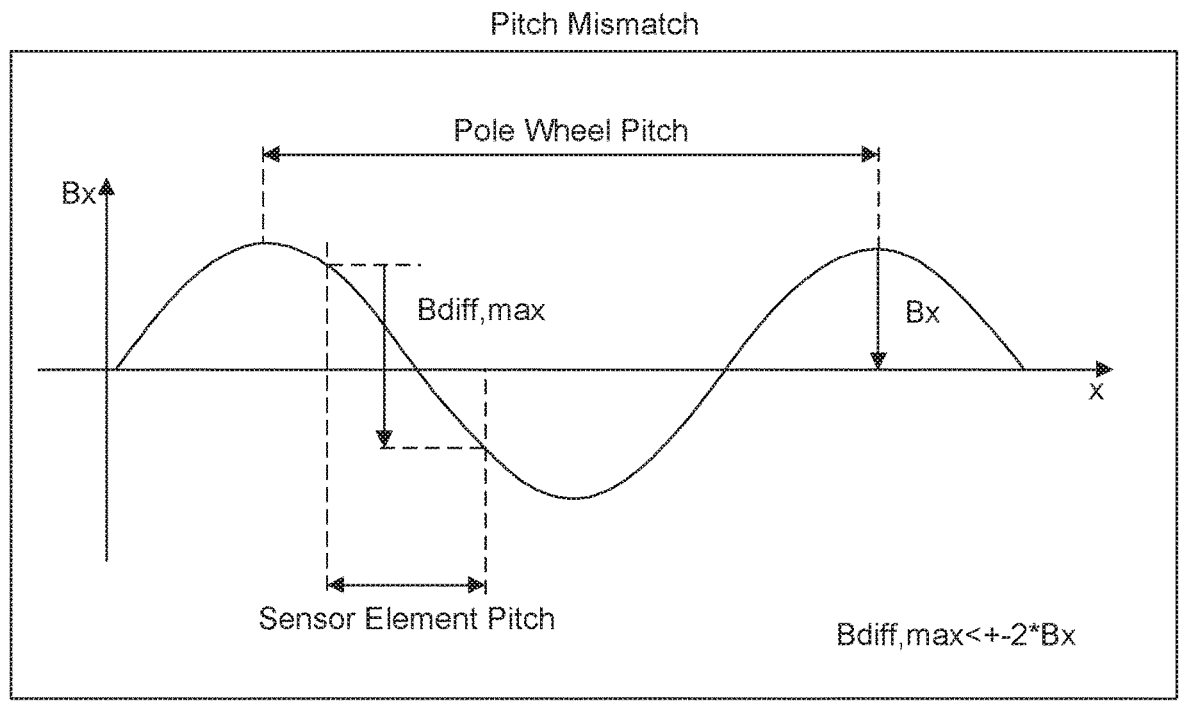

FIGS. 1B-1C illustrates a pitch matching principle according to one or more embodiments. As discussed above, FIG. 1A shows a magnetized encoder wheel 11 and a first sensor arrangement (SE1 and SE2) that has a sensor element pitch that is matched to the pole wheel half-pitch 1:1.

FIG. 1B shows a graph of an oscillating magnetic field that is generated by the magnetized encoder wheel 11 and projected onto the wheel speed sensor in a case where the pitches are ideally matched (i.e., the sensor element pitch that is matched to the pole wheel half-pitch). As can be seen, the peak-to-peak amplitude of a differential sensor signal (Bdiff,max) is equal to two times the maximum amplitude of the x-component Bx of the magnetic field that can be sensed at the wheel speed sensor (e.g., based on the constant air gap between the wheel speed sensor and the wheel). The peak-to-peak amplitude in this case is the maximum value that can be detected by the sensor.

FIG. 1C shows a graph of an oscillating magnetic field that is generated by the magnetized encoder wheel 11 and projected onto the wheel speed sensor in a case where the pitches are mismatched (i.e., the sensor element pitch that is not matched to the pole wheel half-pitch). As can be seen, the peak-to-peak amplitude of a differential sensor signal (Bdiff,max) is damped with respect to the peak-to-peak amplitude shown in FIG. 1B. Thus, the peak-to-peak amplitude in FIG. 1C is less than two times the maximum amplitude of the x-component Bx of the magnetic field that could conceivably be sensed at the wheel speed sensor (e.g., based on the constant air gap between the wheel speed sensor and the wheel) if not for the pitch mismatch.

Further embodiments are described that are capable of determining the wheel pitch and performing compensation on a sensor signal based on the determined wheel pitch or half-pitch. For speed sensors, such as anti-lock braking system (ABS) speed sensors, direction detection is also present. The speed sensor signal and the direction sensor signal are converted to digital signals (i.e., digital values) by the sensor circuit (e.g., including an ADC) and the sensor circuit is further configured to determine the wheel pitch via look-up table, by dividing the two values and checking in a lookup table, or by some other algorithm.

Figure 2:
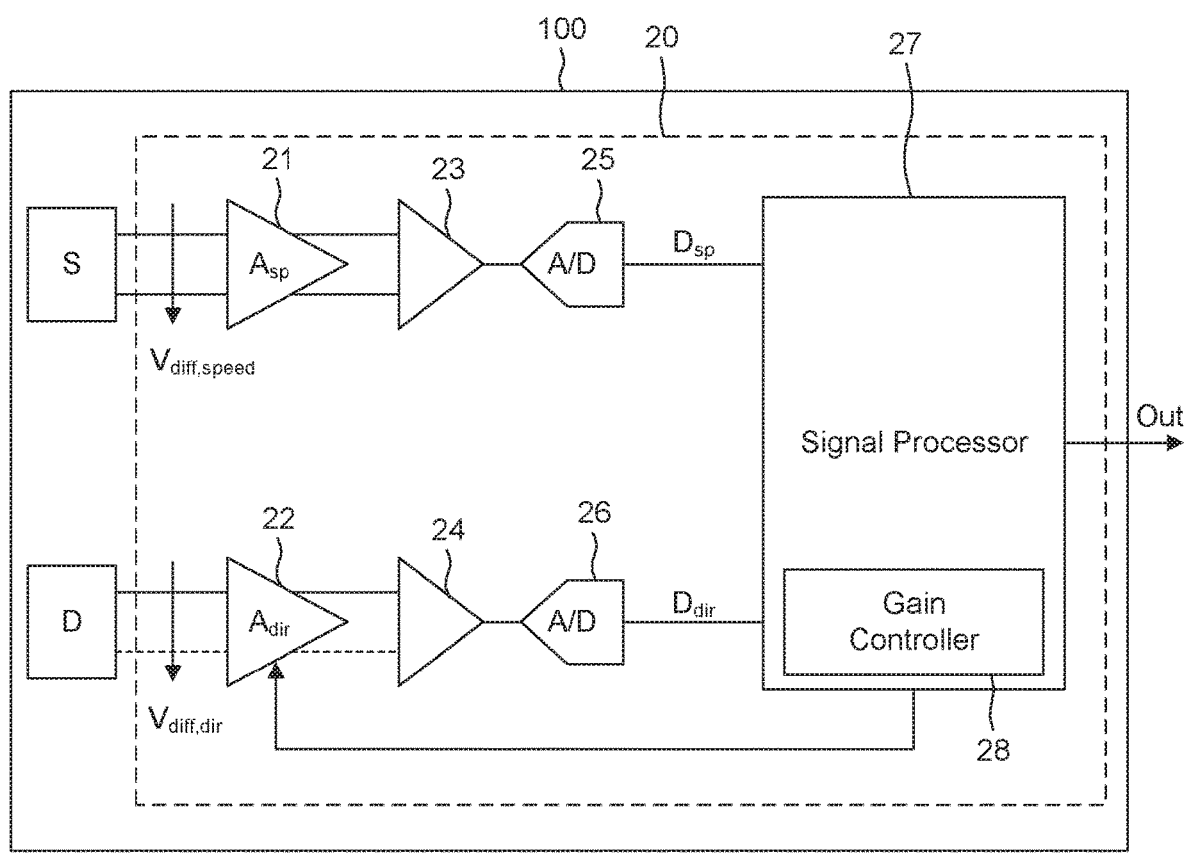
FIG. 2 is a schematic block diagram illustrating a magnetic speed sensor according to one or more embodiments.

FIG. 2 is a schematic block diagram illustrating a magnetic speed sensor 100 according to one or more embodiments. The magnetic speed sensor 100 includes sensor arrangement S and sensor arrangement D that are each configured to generate a differential sensor signal in response to a magnetic field impinging thereon. In particular, sensor arrangement S may include a first group of magnetic field sensor elements arranged in a bridge circuit configuration and is configured to generate a speed sensor signal. Similarly, sensor arrangement D may include a second group of magnetic field sensor elements arranged in a bridge circuit configuration and is to generate a direction sensor signal that is phase shifted, for example by 90°, from the speed sensor signal. The phase shift between the speed signal and direction signal can be evaluated and the rotation direction of a target object can be determined based on whether the phase shift is positive or negative. It will also be appreciated that sensor arrangement D may be a monocell magnetic sensor element (i.e., comprising only a single sensor element), as described above. When sensor arrangement D is a monocell magnetic sensor, the sensor signal generated by the monocell sensor element is used as the direction signal.

The sensor arrangements S and D shown in FIG. 2 may each represent a magnetoresistor bridge that includes a corresponding set of sensor elements that are arranged in a bridge configuration. Sensor elements of sensor arrangement S and are configured to measure magnetic fields according to a same sensing plane (e.g., x-plane, y-plane, or z-plane). Similarly, sensor elements of sensor arrangement D and are configured to measure magnetic fields according to a same sensing plane (e.g., x-plane, y-plane, or z-plane). That is, the sensor elements that make up a bridge have reference directions that are aligned with a same sensing plane.

The magnetic speed sensor 100 also includes a sensor circuit 20 that receives the sensor signals from the sensor arrangements S and D for processing and for generation of pulsed output speed signal and a direction indicator signal at output OUT. The sensor circuit 20 includes two signal paths: an S signal path and a D signal path. The differential speed (S) signal on the S signal path may be in a form of a sinusoidal (sine) waveform that represents a speed of rotation of the target object, and the differential direction (D) signal on the D signal path may be a similar waveform that is phase shifted, for example 90°, from the speed signal. For example, the direction signal may a cosinusoidal waveform that represents a speed of rotation of the target object, but is used by a digital signal processor 27 to determine the direction of rotation by analyzing the phase difference between the speed signal and the direction signal.

Signal paths S and D may each include a pre-amplifier Asp 21 and Adir 22, differential comparators 23 and 24 that output their respective differential signals to respective ADCs 25 and 26.

The sensor arrangement S generates differential sensor signals that have a differential measurement value therebetween, such as a voltage difference Vdiff,speed. The pre-amplifier Asp 21 amplifies these differential sensor signals according to a set gain and provides the amplified differential sensor signals to the differential comparator 23. The differential comparator 23 converts the differential sensor signals to an analog differential measurement signal having a value equal to the voltage difference Vdiff,speed. The ADC 25 converts the analog differential measurement signal into the digital domain, specifically, into a digital differential measurement signal representative of the voltage difference Vdiff,speed.

Similarly, the sensor arrangement D generates at least one sensor signal. In the event that the sensor arrangement D is a monocell arrangement, a signal sensor element is provided to generate a sensor signal that is phase shifted 90° from the analog differential measurement signal of the speed signal path. In this case, the differential comparator 24 would not be needed. Instead, the pre-amplifier Adir 22 amplifies the sensor signal received from sensor arrangement D according to a set gain, and the ADC 26 converts the amplified sensor signal into the digital domain. As a result, signal processor 27 receives a first digital signal from the speed path and a second digital signal from the direction path that is phase shifted from the first digital signal by a predetermined phase shift (e.g., 90°).

Alternatively, sensor arrangement D may generate differential sensor signals, for example via bridge arrangement, where the differential sensor signals have a differential measurement value therebetween, such as a voltage difference Vdiff,dir. The pre-amplifier Asp 22 amplifies these differential sensor signals according to a set gain and provides the amplified differential sensor signals to the differential comparator 24. The differential comparator 24 converts the differential sensor signals to an analog differential measurement signal having a value equal to the voltage difference Vdiff,dir. The ADC 26 converts the analog differential measurement signal into the digital domain, specifically, into a digital differential measurement signal representative of the voltage difference Vdiff,dir. As a result, signal processor 27 receives a first digital signal (i.e., a digital speed signal Dsp) from the speed path and a second digital signal (i.e., a digital direction signal Ddir) from the direction path that is phase shifted from the first digital signal by a predetermined phase shift (e.g., 90°).

The digital signal processor 27 is configured to receive the digital speed signal and the digital direction signal for further processing, including determining a speed and a rotation direction of the target object. Additionally, the signal processor 27 is configured to automatically determine the wheel pitch based on the speed signal and the direction signal, and further compensate or condition the speed signals and/or the direction signals based on the determined wheel pitch. For example, the digital signal processor 23 may include one or more processors and/or logic units that performs various signal conditioning functions, such as absolute signal conversion, normalization, linearization, frequency increase, and so forth. One or more signal conditioning functions may be performed in combination with a lookup table stored in memory. The output OUT of the digital signal processor 27 may provide one or more output signals to an external device, such as an ECU.

For example, the speed of rotation of the target object may be output as a speed pulse signal. Thus, the sinusoidal signal generated by the sensor arrangement S may be translated by the signal processor 27 into pulses, which may be further translated into a movement detection or a speed output. In addition, the signal processor 27 may output a signal that indicates a rotation direction, based on evaluating the phase shift between the digital speed signal and the digital direction signal.

In order to determine the wheel pitch, the signal processor 27 evaluates a difference between an amplitude of the digital speed signal Dsp and an amplitude of the digital direction signal Ddir. For example, the signal processor 27 may use one or more look-up tables to evaluate the difference, may use a coordinate rotation digital computer (CORDIC) operation that calculates a ratio R of the digital speed signal Dsp and the digital direction signal Ddir (e.g., R=Dsp/Ddir or R=Dir/Dsp), or may use a combination thereof. Based on the determined wheel pitch, the signal processor 27 adapts the gain setting of the pre-amplifier Adir 22 via a gain controller 28 so that the ratio R approaches or equals 1:1. In other words, the gain controller 28 is configured to adjust the amplification of the pre-amplifier Adir 22 so that the maximum and minimum amplitudes of the digital direction signal Ddir are substantially equal to the maximum and minimum amplitudes of the digital speed signal Dspeed. By doing so, the signal processor 27 enables the sensor 100 to automatically adapt to different pole wheel pitches to optimize the signal performance according to the ideal pitch matching demonstrated in FIG. 1B.

Figure 3A:
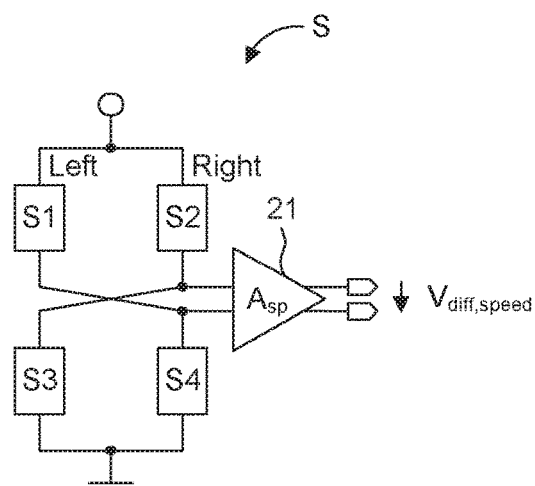
FIG. 3A is a schematic diagram of a first sensor arrangement with a pre-amplifier according to one or more embodiments.
Figure 3B:
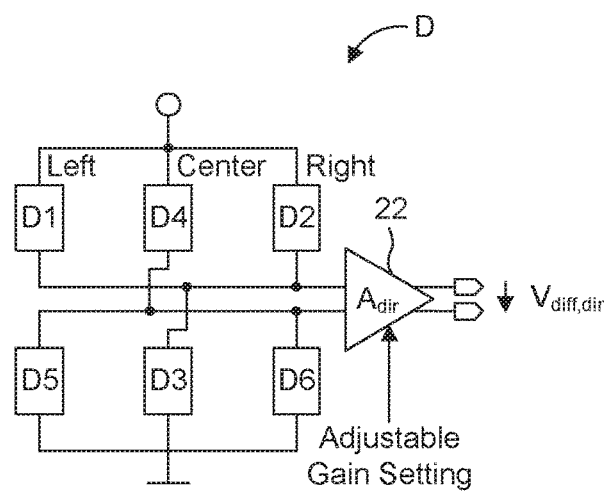
FIG. 3B is a schematic diagram of a second sensor arrangement with a pre-amplifier according to one or more embodiments.
Figure 3C:
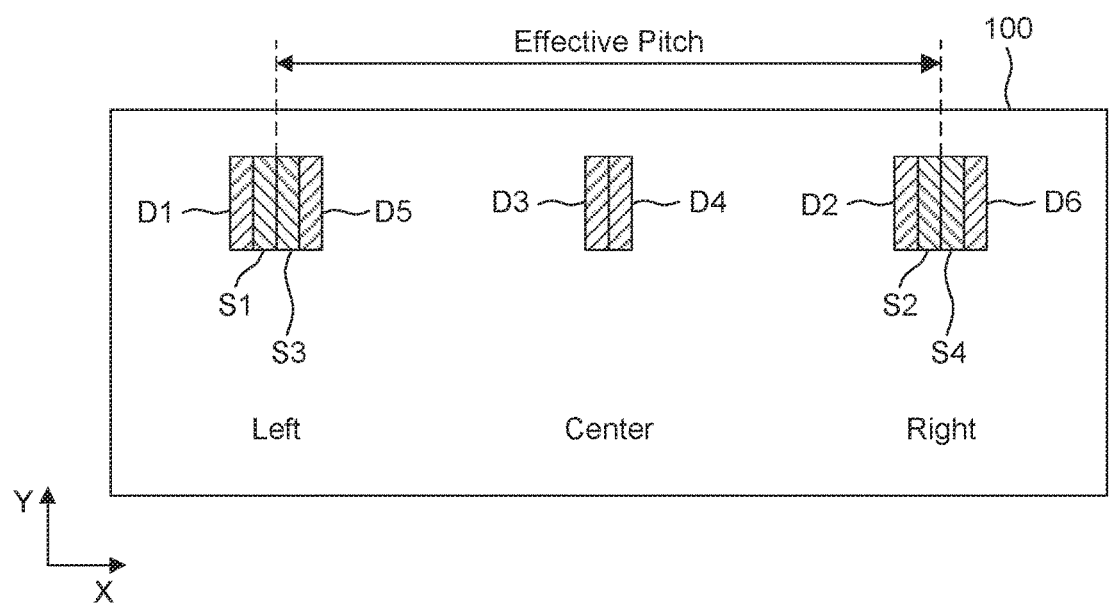
FIG. 3C shows a schematic block diagram of a speed sensor arrangement and a direction sensor arrangement of a magnetic speed sensor according to one or more embodiments.

FIG. 3A is a schematic diagram of a first sensor arrangement with a pre-amplifier according to one or more embodiments. FIG. 3B is a schematic diagram of a second sensor arrangement with a pre-amplifier according to one or more embodiments. FIG. 3C shows a schematic block diagram of a speed sensor arrangement and a direction sensor arrangement of a magnetic speed sensor according to one or more embodiments.

Specifically, the first sensor arrangement corresponds to the sensor arrangement S including four sensor elements S1-S4 arranged in a first bridge configuration connected between a first and a second supply terminal, and the second sensor arrangement corresponds to the sensor arrangement D including six sensor elements D1-D6 arranged in a second bridge configuration connected between the first and the second supply terminal. It will be appreciated that the sensor arrangement S and D are neither limited in the number of sensor elements or to the particular bridge configurations shown.

The magnetic sensor bridge circuit S comprises a first magnetoresistive sensor element S1 and a fourth magnetoresistive sensor element S4. The first and the fourth magnetoresistive sensor elements S1 and S4 are connected in series. Furthermore, the magnetic sensor bridge circuit S comprises a second magnetoresistive sensor element S2 and a third magnetoresistive sensor element S3. The second and the third magnetoresistive sensor elements S2 and S3 are connected in series. The first and the third magnetoresistive sensor elements S1 and S3 are connected to a first supply terminal of the magnetic sensor bridge circuit X. The second and the fourth magnetoresistive sensor elements S2 and S4 are connected to a second, different supply terminal of the magnetic sensor bridge circuit S.

The magnetic sensor bridge circuit D comprises a first magnetoresistive sensor element D1 and a second magnetoresistive sensor element D2 connected in parallel and further connected in series with a third magnetoresistive sensor element D3. Furthermore, the magnetic sensor bridge circuit D comprises a fourth magnetoresistive sensor element D4 connected in series with a fifth magnetoresistive sensor element D5 and a sixth magnetoresistive sensor element D6 that are connected in parallel with each other. Connections to the first and the second supply terminals are also provided.

The differential sensor signals generated by sensor arrangement S and D are amplified by respective pre-amplifiers Asp 21 and Adir 22. The amplified differential sensor signals have a differential value therebetween, represented by Vdiff,speed and Vdiff,dir, respectively. The gain setting of the pre-amplifier Adir 22 is adjustable such that the extrema of Vdiff,dir is equal to or substantially equal to the extrema of Vdiff,speed, albeit shifted 90° from each other.

FIG. 3C illustrates an example arrangement of sensor elements S1-S4 and D1-D6 linearly arranged on a sensor chip (e.g., on an x-axis), where the sensor elements are placed in three different regions: a left region, a center region, and a right region. The geometric center of the sensor arrangements is located at a first geometric center of the center sensor elements D3 and D4. The effective sensor element pitch is defined by the distance between a second geometric center of the left sensor elements and a third geometric center of the right sensor elements. The second and third geometric centers are equidistant from the first geometric center.

Equation 1 provided below is a formula for calculating a damping factor for the speed signal according to a matching of the pole wheel pitch ($pitch_{PW}$) to the effective sensor element pitch ($pitch_{SE}$) by a ratio of 1:2 (i.e., the effective sensor element pitch is matched to the pole wheel half-pitch). Equation 2 provided below is a formula for calculating a damping factor for the direction signal according to a matching of the pole wheel pitch ($pitch_{PW}$) to the effective sensor element pitch ($pitch_{SE}$) by a ratio of 1:2 (i.e., the effective sensor element pitch is matched to the pole wheel half-pitch). Equation 3 provided below is a formula for calculating a pitch mismatch dependent ratio by dividing Equation 2 by Equation 1.

$$\frac{B_{diff,sp}}{B_x} = 2 \cdot \sin\left(\frac{pitch_{SE}}{pitch_{PW}} \cdot \pi\right) \qquad \text{Eq. 1}$$

$$\frac{B_{diff,dir}}{B_x} = 1 - \cos\left(\frac{pitch_{SE}}{pitch_{PW}} \cdot \pi\right) \qquad \text{Eq. 2}$$

$$\frac{B_{diff,dir}}{B_{diff,sp}} = \frac{1}{2} \cdot \frac{1 - \cos\left(\frac{pitch_{SE}}{pitch_{PW}} \cdot \pi\right)}{\sin\left(\frac{pitch_{SE}}{pitch_{PW}} \cdot \pi\right)} \qquad \text{Eq. 3}$$

As noted above, the signal processor may implement a look-up table method for detecting a pole wheel pitch and adjusting the gain of the pre-amplifier Adir 22 according to the detected pole wheel pitch. Two or more pole wheel pitches may be known and programmed into the look-up table. In the following examples, wheel pitches 4.4 mm and 5.7 mm are correlated to total amplitude values of the digital measurement signals Dsp and Ddir (see: look-up table 1) or to the value of the least significant bit (LSB) of the digital measurement signals Dsp and Ddir (see: look-up table 2).

| | LOOK-UP TABLE 1 | | |
|---|---|---|---|
| Row # | Dsp [µT] | Ddir_4.4mm [µT] | Ddir_5.7 mm [µT] |
| 1 | 180 | 56 | 41 |
| 2 | 232 | 72 | 53 |
| 3 | 299 | 92 | 68 |
| ... | ... | ... | ... |

According to look-up table 1, the signal processor 27 is configured to discrimination between two predefined wheel pitches and detect which wheel pitch is present before the speed sensor 100. To make the determination, the signal processor 27 is configured to select a row of the table based on the measured amplitude value of the digital speed signal Dsp. Once a row is selected, the signal processor 27 evaluates the measured amplitude value of the digital direction signal Ddir to select a corresponding wheel pitch identified in the second and third columns. For example, if an amplitude value of the digital speed signal Dsp is 102, the second row is selected. Following the selection of the second row, an amplitude value of 95 for the digital direction signal Ddir indicates that the wheel pitch is 4.4 mm and an amplitude value of 70 for the digital direction signal Ddir indicates that the wheel pitch is 5.7 mm. Based on the determination of the wheel pitch, the gain controller 28 is configured to set a gain setting of the pre-amplifier Adir 22 for the direction signal that is predefined for the wheel pitch. That is, each programmed wheel pitch has a corresponding gain setting that is implemented by the gain controller 28.

| | LOOK-UP TABLE 2 | | |
|---|---|---|---|
| Row # | Dsp [LSB] | Ddir_4.4 mm [LSB] | Ddir_5.7 mm [LSB] |
| 1 | 79 | 73 | 54 |
| 2 | 102 | 95 | 70 |

-continued

LOOK-UP TABLE 2

| Row # | Dsp [LSB] | Ddir_4.4 mm [LSB] | Ddir_5.7 mm [LSB] |
|---|---|---|---|
| 3 | 132 | 122 | 90 |
| ... | ... | ... | ... |

A similar procedure can be implemented by using the least significant bits (LSB) of the digital speed signal Dsp and the digital direction signal Ddir of a predetermined number of bits, as demonstrated by look-up table 2. Here, "LSB" represents the number of bits of the ADC that digitizes the speed and the direction signals. The ADC output has a range [0; $2^{N-1}$], wherein N is the number of bits of the ADC. Thus, the digital values to be compared with the digital values output by the ADCs 25 and 26 are provided in the above table.

The rule in order to build a correct look-up table consists of not making overlapping the ranges of the Ddir_4.4 mm (differential speed field range in case of wheel pitch 4.4 mm) with the ranges of the Ddir_5.7 mm (differential direction field range in case of wheel pitch 5.7 mm). Since the amplitude values will be bigger if the wheel pitch of the reference wheel is smaller, the values in column Ddir_4.4 mm will be greater than their corresponding values in column Ddir_5.7 mm within the same row.

The signal processor 27 may also apply a pseudo-code for changing the applied gain to the direction preamplifier Adir 22. One example of pseudo-code is provided as follows:

```
dir_gain_pre-amp=24;         // default setting Ddir_4.4 mm
if Dsp < 102
    if Ddir < 70
        dir_gain_pre-amp=32;     //Ddir_5.7 mm
else if Dsp < 132
    if Ddir < 90
        dir_gain_pre-amp=32;     //Ddir_5.7 mm
else if Dsp < 145
    if Ddir < 116
        dir_gain_pre-amp=32;     //Ddir_5.7 mm
```

Thus, a string of if then else statements may be formalized or realized by a logic circuit that is used to discriminate the wheel pitch and select a corresponding gain setting based on the combination of the first measurement value and the second measurement value satisfying one of the if then else statements. The if then else statements may be used in code to confirm specific conditions for applying different gain settings (dir_gain_pre-amp) for the direction preamplifier Adir 22. The signal processor 27 is configured to select the corresponding gain setting based on if then else statements, where the signal processor selects the corresponding gain setting based on a combination of the digital speed signal Dsp (e.g., an amplitude value thereof) and the digital direction signal Ddir (e.g., an amplitude value thereof) satisfying one of the if then else statements. Additional lines of code (e.g., additional logic in the logic circuit) can be added for additional gain settings corresponding to additional wheel pitches, where additional conditions based on speed and direction signal amplitudes are added to discriminate the correct wheel pitch.

In addition, CORDIC operations are capable of calculating the division between two values. Thus, the signal processor 27 may be configured to divide the speed signal amplitude by the direction signal amplitude to determine a ratio. In case of a wheel pitch of 4.4 mm, the ratio is close to 1 because the direction path is designed in order to have an almost one-to-one LSB14 signal amplitude in the digital domain. If the division between speed and direction amplitudes result in ratio equal to or larger that a predefined ratio (e.g., equal to or larger than 1.3), the signal processor 27 is configured to increase the direction pre-amplification gain setting from 24 to 32, with 32 being the optimized amplification for a wheel pitch of 5.7 mm in this example and 24 being the optimized amplification for a wheel pitch of 4.4 mm. On the other hand, if the ratio is less than the predefined ratio (e.g., less than 1.3), the signal processor 27 is configured to set, maintain, or decrease the direction pre-amplification to a gain setting of 24. It will be appreciated that the number of ratio constants or ratio ranges increases with the number of possible pre-amplification options and the number of pole wheel pitches available. That is, as a number of ratio ranges increases and the ratio range thereof may become narrower as more wheel pitches are programmed. Thus, multiple ratio ranges may be defined according to the number of wheel pitches to be discriminated by the signal processor 27.

In view of the above, there a plurality of ways the signal processor 27 can correlate a combination of the digital speed signal Dsp (e.g., an amplitude value thereof) and the digital direction signal Ddir (e.g., an amplitude value thereof) to a corresponding gain setting of a plurality of gain settings, select the corresponding gain setting from among the plurality of gain settings based on the combination of digital speed and direction values, and set the selected corresponding gain setting as the gain setting of the direction preamplifier Adir 22.

The pole wheel pitch may be determined either explicitly or implicitly via look-up, code, and/or arithmetic where the direction amplifier gain is selected based on the explicit or implicit determination of the wheel pitch. If explicitly determined, each pole wheel pitch may be explicitly mapped to a corresponding direction amplifier gain. Implicit mappings may also exist without the explicit determination of the pole wheel pitch. Each of the plurality of gain settings stored in memory of the sensor circuit 20 corresponds to one of a plurality of pole wheel pitches programmed in the memory of the sensor circuit 20. Thus, the plurality of gain settings are available to the signal processor 27 (e.g., to the gain controller 28) for selection based on a selection algorithm.

While various embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A sensor device, comprising:
a first sensor arrangement comprising a plurality of first sensor elements configured to generate first sensor signals based on sensing a varying magnetic field generated by a pole wheel having a pole wheel pitch, wherein the first sensor signals represent a first differential signal that defines a first measurement value;
a second sensor arrangement comprising at least one second sensor element configured to generate at least one second sensor signal based on sensing the varying magnetic field generated by the pole wheel, wherein the at least one second sensor signal defines a second measurement value that is phase shifted from the first measurement value;
a first amplifier circuit configured to receive and amplify the first sensor signals to generate amplified first sensor signals;
a second amplifier circuit configured to receive and amplify the at least one second sensor signal to generate at least one amplified second sensor signal; and
a sensor circuit configured to convert the amplified first sensor signals into the first differential signal having the first measurement value and convert the at least one amplified second sensor signal into a measurement signal having the second measurement value,
wherein the sensor circuit comprises a signal processor configured to detect the pole wheel pitch based on the first measurement value and the second measurement value, and adjust a gain setting of the second amplifier circuit based on the detected pole wheel pitch.

2. The sensor device of claim 1, wherein the measurement signal is shifted 90° from the first differential signal.

3. The sensor device of claim 1, wherein the second sensor arrangement comprises a plurality of second sensor elements configured to generate second sensor signals based on sensing the varying magnetic field generated by the pole wheel, wherein the second sensor signals represent a second differential signal that defines the second measurement value.

4. The sensor device of claim 3, wherein:
the second amplifier circuit is configured to receive and amplify the second sensor signals to generate amplified second sensor signals;
the sensor circuit configured to convert the amplified second sensor signals into the measurement signal, the measurement signal being the second differential signal having the second measurement value,
the signal processor is configured to detect the pole wheel pitch based on the first measurement value and the second measurement value, and adjust the gain setting of the second amplifier circuit based on the detected pole wheel pitch.

5. The sensor device of claim 4, wherein the first measurement value is a first differential value and the second measurement value is a second differential value.

6. The sensor device of claim 3, wherein the plurality of first sensor elements are arranged in a first bridge circuit and the plurality of second sensor elements are arranged in a second bridge circuit.

7. The sensor device of claim 1, wherein:
the signal processor is configured to correlate a combination of the first measurement value and the second measurement value to a corresponding gain setting of a plurality of gain settings, select the corresponding gain setting from among the plurality of gain settings based on the combination of the first measurement value and the second measurement value, and set the selected corresponding gain setting as the gain setting of the second amplifier circuit.

8. The sensor device of claim 7, wherein each of the plurality of gain settings corresponds to one of a plurality of pole wheel pitches programmed in memory of the sensor circuit.

9. The sensor device of claim 7, wherein:
the signal processor is configured to detect the pole wheel pitch using a look-up table, wherein the signal processor determines the pole wheel pitch based on the combination of the first measurement value and the second measurement value within the look-up table, and selects the corresponding gain setting based on the determined the pole wheel pitch.

10. The sensor device of claim 7, wherein:
the signal processor is configured to select the corresponding gain setting using a look-up table, wherein the signal processor selects the corresponding gain setting based on the combination of the first measurement value and the second measurement value within the look-up table.

11. The sensor device of claim 7, wherein:
the signal processor is configured to select the corresponding gain setting based on a logic circuit formalized by if then else statements, wherein the signal processor selects the corresponding gain setting based on the combination of the first measurement value and the second measurement value satisfying one of the if then else statements.

12. The sensor device of claim 7, wherein:
the signal processor is configured to calculate a ratio of the first measurement value and the second measurement value, compare the ratio to at least one threshold to generate a comparison result, and select the corresponding gain setting based the comparison result.

13. The sensor device of claim 7, wherein:
the signal processor is configured select the corresponding gain setting based on a ratio of the first measurement value and the second measurement value.

14. The sensor device of claim 7, wherein:
the signal processor is configured to calculate a ratio of the first measurement value and the second measurement value, determine a threshold range from a plurality of threshold ranges in which the ratio is located, and select the corresponding gain setting based on the determined threshold range.

15. The sensor device of claim 7, wherein the signal processor is configured to calculate a ratio of the first measurement value and the second measurement value, and select the corresponding gain setting based the ratio.

16. A sensor device, comprising:
a first sensor arrangement comprising a plurality of first sensor elements configured to generate first sensor signals based on sensing a varying magnetic field generated by a pole wheel having a pole wheel pitch, wherein the first sensor signals represent a first differential signal that defines a first measurement value;
a second sensor arrangement comprising at least one second sensor element configured to generate at least one second sensor signal based on sensing the varying magnetic field generated by the pole wheel, wherein the at least one second sensor signal defines a second measurement value that is phase shifted from the first measurement value;
a first amplifier circuit configured to receive and amplify the first sensor signals to generate amplified first sensor signals;
a second amplifier circuit configured to receive and amplify the at least one second sensor signal to generate at least one amplified second sensor signal; and
a sensor circuit configured to convert the amplified first sensor signals into the first differential signal having the first measurement value and convert the at least one amplified second sensor signal into a measurement signal having the second measurement value,
wherein the sensor circuit comprises a signal processor configured to correlate a combination of the first measurement value and the second measurement value to a corresponding gain setting of a plurality of gain settings, select the corresponding gain setting from among the plurality of gain settings based on the combination of the first measurement value and the second measurement value, and set the selected corresponding gain setting as the gain setting of the second amplifier circuit.

17. The sensor device of claim 16, wherein the corresponding gain setting is optimized for the pole wheel pitch.

18. A method for calibrating a magnetic field sensor circuit based on a pole wheel pitch of a pole wheel, the method comprising:
generating first sensor signals, by a first sensor arrangement, based on sensing a varying magnetic field generated by the pole wheel, wherein the first sensor signals represent a first differential signal that defines a first measurement value;
generating at least one second sensor signal, by a second sensor arrangement, based on sensing the varying magnetic field generated by the pole wheel, wherein the at least one second sensor signal defines a second measurement value that is phase shifted from the first measurement value;

amplifying the first sensor signals, by a first amplifier circuit, to generate amplified first sensor signals;
amplifying the at least one second sensor signal, by a second amplifier circuit, to generate at least one amplified second sensor signal;
converting the amplified first sensor signals, by a sensor circuit, into the first differential signal having the first measurement value;
converting the at least one amplified second sensor signal, by the sensor circuit, into a measurement signal having the second measurement value;
correlating, by the sensor circuit, a combination of the first measurement value and the second measurement value to a corresponding gain setting of a plurality of gain settings;
selecting, by the sensor circuit, the corresponding gain setting from among the plurality of gain settings based on the combination of the first measurement value and the second measurement value; and
setting, by the sensor circuit, the selected corresponding gain setting as the gain setting of the second amplifier.

19. The method of claim 18, wherein each of the plurality of gain settings corresponds to one of a plurality of pole wheel pitches programmed in memory of the sensor circuit.

20. The method of claim 18, further comprising:
detecting, by the sensor circuit, the pole wheel pitch using a look-up table, including determining the pole wheel pitch based on the combination of the first measurement value and the second measurement value within the look-up table, and selecting the corresponding gain setting based on the determined the pole wheel pitch.

21. The method of claim 18, further comprising:
selecting, by the sensor circuit, the corresponding gain setting using a look-up table, including selecting the corresponding gain setting based on the combination of the first measurement value and the second measurement value within the look-up table.

22. The method of claim 18, further comprising:
selecting, by the sensor circuit, the corresponding gain setting based on a logic circuit formalized by if then else statements, including selecting the corresponding gain setting based on the combination of the first measurement value and the second measurement value satisfying one of the if then else statements.

23. The method of claim 18, further comprising:
calculating, by the sensor circuit, a ratio of the first measurement value and the second measurement value;
comparing, by the sensor circuit, the ratio to at least one threshold to generate a comparison result; and
selecting, by the sensor circuit, the corresponding gain setting based the comparison result.

24. The method of claim 19, further comprising:
selecting, by the sensor circuit, the corresponding gain setting based on a ratio of the first measurement value and the second measurement value.

25. The method of claim 18, further comprising:
calculating, by the sensor circuit, a ratio of the first measurement value and the second measurement value;
determining, by the sensor circuit, a threshold range from a plurality of threshold ranges in which the ratio is located; and
selecting, by the sensor circuit, the corresponding gain setting based on the determined threshold range.

26. The method of claim 18, further comprising:
calculating, by the sensor circuit, a ratio of the first measurement value and the second measurement value; and
selecting, by the sensor circuit, the corresponding gain setting based the ratio.

* * * * *